United States Patent Office.

HENRY DISSTON, OF PHILADELPHIA, PENNSYLVANIA.

*Letters Patent No. 63,487, dated April 2, 1867.*

---

IMPROVED MODE OF MANUFACTURING SAW-BLADES.

---

The Schedule referred to in these Letters Patent and making part of the same.

---

TO ALL WHOM IT MAY CONCERN:

Be it known that I, HENRY DISSTON, of Philadelphia, Pennsylvania, have invented an improved Saw-Blade; and I do hereby declare the following to be a full, clear, and exact description of one manner in which the same may be made.

In making the blade of a circular saw, for instance, I take a plate of the very best wrought iron, or of the inferior steel known as homogeneous or Bessemer steel, and after cutting from the said plate a blade of the desired shape, I grind and flatten the latter, and then submit it to the following process:

I prepare a bath by melting together Turk's Island salt and prussate of potash, in the proportion of one part of potash to three parts of salt. When this bath is red hot, I dip the blade into the same, and let it remain as long after it is red hot as may be desired; it is then removed and plunged into a bath of oil or water, or is chilled in any other suitable manner, after which, if required, it may be cut to receive the detachable teeth, tempered and straightened.

Heretofore it has been the practice to make saw-blades of the very best cast-steel, tempered and hardened so as to have the desired rigidity and toughness. I produce a plate having both these qualities, at a very cheap rate. While the inner portion of the metal retains the toughness of the iron or common Bessemer steel, the portion near the outer surface is carbonized or converted into steel, which imparts the desired rigidity to the blade.

An important feature of my improved saw-blade is the facility with which it can be cut for the reception of detachable teeth, the inside of the metal where grooves have to be cut being comparatively soft.

Other materials, as well as those described, may be used for carbonizing the surface of the metal. Without confining myself, therefore, to the precise materials used, and without claiming the process described,

I claim as my invention, and desire to secure by Letters Patent, as a new manufacture—

A saw-blade composed of tough wrought iron, or homogeneous or Bessemer steel, and having a hard carbonized exterior surface.

In testimony whereof I have signed my name to this specification in the presence of two subscribing witnesses.

HENRY DISSTON.

Witnesses:
   JOHN WHITE,
   W. J. R. DELANY.